Feb. 19, 1929.  
J. F. PETERS  
SURGE RECORDER  
Filed July 31, 1924  
1,702,412
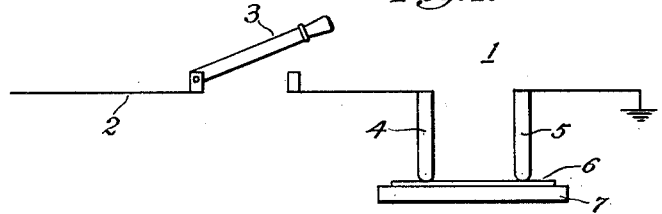
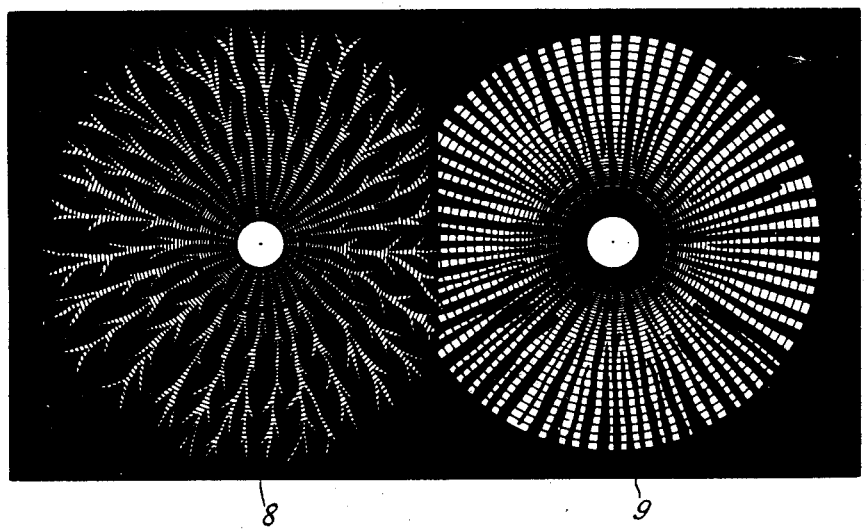
WITNESSES:  
INVENTOR  
John F. Peters  
BY  
ATTORNEY Patented Feb. 19, 1929.

1,702,412

UNITED STATES PATENT OFFICE.

JOHN F. PETERS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SURGE RECORDER.

Application filed July 31, 1924. Serial No. 729,425.

My invention relates to electrical instruments and particularly to instruments for recording surges of voltage or current.

In my copending application, Serial No. 680,569, filed December 13, 1923, I have described a surge recorder that is adapted to be connected to an electric circuit and to provide a record of the character of surges of current in the circuit.

My present invention relates to an improvement upon the invention described in my prior application and it has for its object the provision of an improved record of the surges to which it is subjected.

In accordance with my invention, a sensitized recording element is arranged in cooperative relation with two electrodes. One of the electrodes is connected to the circuit that is subject to surges and the other electrode is grounded. As pointed out in my prior application, a different indication is effected when the electrode is positive with respect to the recording element from that produced when the electrode is negative and the size of the figures produced is a measure of the surge voltage. However, for the same voltage, the positive figure is larger than the negative for small surges and, therefore it may be measured more readily.

The object of my invention, therefore, is to provide a surge recorder that shall record both positive and negative figures for each surge and thus effect an improved record of the characteristics of the surge.

For a better understanding of my invention, reference may be had to the accompanying drawings, wherein—

Figure 1 is a diagrammatic view of a surge recorder constructed in accordance with the invention, and Fig. 2 is a view on an enlarged scale of the record produced by a surge.

Referring to Fig. 1, the surge recorder 1 is connected to a line 2 that is subjected to abnormal surges of the voltage or current. A disconnecting switch 3 is provided for the purpose of disconnecting the surge recorder from the line when desired. When used in connection with high voltage lines, a voltage multiplier, such as that disclosed in my above-mentioned application, is inserted between the surge recorder and the line, in order to reduce the voltage to a suitable value. The working range of the instrument is between approximately 3000 and 20,000 volts.

The surge recorder 1 comprises two conducting electrodes 4 and 5 in contact with a sensitized recording element 6, such as a photographic plate coated with the usual emulsion. A metal plate 7 supports the sensitized plate 6 and forms an electrostatic condenser with the electrodes 4 and 5. The sensitized plate 6 is adapted to be inclosed in a light-proof casing (not shown) in order to protect the emulsion from exposure.

Upon the occurrence of a surge in the line 2 that produces potentials in excess of 3000 volts between the electrodes 4 and 5 and the plate 7, figures are formed upon the sensitized plate 6 even though the surge lasts only a few millionths of a second. The size and appearance of the figures are indicative of the magnitude and duration of the surge.

In Fig. 2 is shown a sensitized plate after it has been subjected to a surge. The left-hand figure 8 is a positive figure and indicates that the surge was positive with respect to ground potential. In other words, the left-hand electrode 4 was positive with respect to the plate 7. On account of the capacity between the electrodes 4 and 5 and the plate 7, when the electrode 4 is positive, the electrode 5 is negative and consequently produces a negative figure, such as that shown at 9. If the surge had been of the opposite polarity, the figures 8 and 9 would have been reversed.

The diameter of the figures is dependent upon the voltage of the surge and since the positive figure 8 is larger than the negative figure 9, it is easier to determine the voltage from the positive figure in the case of small surges. By means of the recorder shown that provides both positive and negative figures for every surge, it is possible to determine the voltage from the positive figure in each case.

I do not consider that my invention is limited to the precise construction shown and described inasmuch as various modifications thereof will occur to those skilled in the art. Accordingly, I do not wish the invention to be limited in scope except by the appended claims.

I claim as my invention:

1. An instrument comprising a plurality of electrodes, a sensitized element, and means including and co-operating with said electrodes for producing both positive and negative figures upon said element when the instrument is subjected to a surge.

2. A surge recorder comprising a sensitized recording element, and capacity-establishing means for producing simultaneous positive and negative figures thereon.

3. The combination, for use with a line subject to abnormal surges, comprising a recording element and two electrodes in engagement therewith, one of said electrodes being connected to said line and the other to ground.

4. An instrument comprising two electrodes, a sensitized element in engagement with both electrodes and means including said electrodes for producing two figures upon said element when the instrument is subjected to a surge.

5. An instrument comprising a conducting member, a sensitized element thereon, a plurality of electrodes in engagement with said element and means including said electrodes for producing simultaneous positive and negative figures thereon when the instrument is subjected to a surge.

6. The combination, for use with a line subject to abnormal surges, comprising a sensitized recording element, two electrodes in engagement with said element, one of said electrodes being connected to said line and the other to ground, and a conducting member extending between said electrodes but insulated therefrom.

7. An instrument comprising a recording element, a plurality of electrodes engaging said element, one of said electrodes being grounded, and a conducting member adjacent said electrodes and forming an electrostatic condenser therewith.

8. A method of obtaining a positive and a negative record of a surge on an electrical system which consists in subjecting a sensitized element to the electrostatic influence of two members of opposite polarity in a condenser system.

In testimony whereof, I have hereunto subscribed my name this 29th day of July, 1924.

JOHN F. PETERS.